(12) United States Patent
Hsu

(10) Patent No.: US 11,436,184 B2
(45) Date of Patent: Sep. 6, 2022

(54) MULTI-CONTROLLER STORAGE SYSTEM AND STORAGE APPARATUS

(71) Applicant: QNAP SYSTEMS, INC., New Taipei (TW)

(72) Inventor: Chin-Hsing Hsu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 214 days.

(21) Appl. No.: 16/860,167

(22) Filed: Apr. 28, 2020

(65) Prior Publication Data

US 2020/0349105 A1 Nov. 5, 2020

(30) Foreign Application Priority Data

Apr. 30, 2019 (TW) .................................. 108115034

(51) Int. Cl.
*G06F 15/173* (2006.01)
*G06F 13/42* (2006.01)

(52) U.S. Cl.
CPC .... *G06F 15/17331* (2013.01); *G06F 13/4282* (2013.01); *G06F 2213/0026* (2013.01)

(58) Field of Classification Search
CPC .......... G06F 15/17331; G06F 13/4282; G06F 2213/0026; G06F 13/4295; G06F 13/28
USPC .......................................................... 709/212
See application file for complete search history.

(56) References Cited

U.S. PATENT DOCUMENTS

| 2015/0363109 | A1 | 12/2015 | Frick et al. |
| 2017/0285997 | A1* | 10/2017 | Stabrawa ............... G06F 3/0604 |
| 2018/0095871 | A1* | 4/2018 | Dreier ..................... G06F 3/061 |

FOREIGN PATENT DOCUMENTS

| CN | 101739220 | 6/2010 |
| CN | 103049220 | 4/2013 |
| CN | 104461777 | 3/2015 |
| CN | 104536702 | 4/2015 |
| CN | 105068760 | 11/2015 |
| CN | 107526542 | 12/2017 |
| TW | I556171 | 11/2016 |

OTHER PUBLICATIONS

Taiwan Intellectual Property Office, "Office Action", dated May 22, 2020.

* cited by examiner

*Primary Examiner* — David R Lazaro
*Assistant Examiner* — Zia Khurshid
(74) *Attorney, Agent, or Firm* — WPAT, PC

(57) ABSTRACT

A multi-controller storage system and a storage apparatus for performing data access to a non-volatile memory with multiple controllers are provided. When a host transmits a command to a first controller and the first controller assigns the command to a second controller, the first controller transfers data from the host to the second controller through the first controller through the non-volatile memory express over remote direct memory access protocol (NVMe over RDMA) to directly write the data into the second controller.

10 Claims, 3 Drawing Sheets

MULTI-CONTROLLER STORAGE SYSTEM AND STORAGE APPARATUS

FIELD OF THE INVENTION

The present disclosure relates to a multi-controller storage system and a storage apparatus using the remote direct memory access (RDMA) protocol, and particularly to a multi-controller storage system and a storage apparatus using the non-volatile memory express (NVMe) over remote direct memory access protocol (NVMe over RDMA).

BACKGROUND OF THE INVENTION

In a centralized data management system based on cloud storage technology, a data storage apparatus usually processes multiple write requests in parallel. Therefore, the data storage apparatus may transmit these write requests to several different controllers for distributed processing. In general, among these controllers, there is one primary controller and at least one secondary controller. All of the write requests are centralized in the primary controller which is responsible for distributing the write requests to the at least one secondary controller, and then the write requests are processed by the corresponding secondary controller(s). During the centralizing and distributing procedures, the application data corresponding to each write request are previously stored in the scratchpad memory (SPM) of the primary controller, the previously stored application data together with the corresponding write request are transmitted to and stored in the corresponding secondary controller to whom the write request is assigned, and the corresponding secondary controller writes the received application data into a storage area of the data storage apparatus.

Based on such architecture, the application data are frequently stored and transferred before being correctly written into the data storage apparatus, and the entire process requires considerable processing time. Furthermore, frequent storing and transferring actions also increase the occurrence of data failure. It is desired to improve the architecture to overcome the problems.

SUMMARY OF THE INVENTION

An aspect of the present disclosure provides a multi-controller storage system using a NVMe over RDMA protocol. The multi-controller storage system includes a host and a storage apparatus. The host includes a main memory for storing application data, and transfers the application data from the main memory through a remote direct memory access (RDMA) protocol. The storage apparatus includes a first controller, a second controller and a non-volatile memory. The first controller includes a first processor, a first memory, a first remote connector and a first local connector. The first processor is electrically coupled to the first memory, the first remote connector and the first local connector. The data transmission between the first remote connector and the host are performed through the RDMA protocol. The second controller includes a second processor, a second memory and a second local connector, the second processor is electrically coupled to the second memory and the second local connector. The first local connector is electrically coupled to the second local connector. The non-volatile memory is electrically coupled to the first controller and the second controller and accessible to the first processor and the second processor. In the multi-controller storage system, the second processor transmits space indicator information, representing a location of a reserved space in the second memory, to the first controller through the second local connector and the first local connector. When the host transmits a data write command to the first controller and the first controller assigns the data write command to the second controller, the first controller transmits the space indicator information to the first remote connector to control the first remote connector to use the RDMA protocol to make the application data transferred from the host to the second memory through the first remote connector, the first local connector and the second local connector in sequence and written into the reserved space in the second memory.

Another aspect of the present disclosure provides a storage apparatus using a NVMe over RDMA protocol and adapted to be used for receiving application data from a host. The storage apparatus includes a first controller, a second controller and a non-volatile memory. The first controller includes a first processor, a first memory, a first remote connector and a first local connector. The first processor is electrically coupled to the first memory, the first remote connector and the first local connector. The data transmission between the first remote connector and the host are performed through the RDMA protocol. The second controller includes a second processor, a second memory and a second local connector. The second processor is electrically coupled to the second memory and the second local connector. The first local connector is electrically coupled to the second local connector. The non-volatile memory is electrically coupled to the first controller and the second controller and accessible to the first processor and the second processor. The second processor transmits space indicator information, representing a location of a reserved space in the second memory, to the first controller through the second local connector and the first local connector. When the host transmits a data write command to the first controller and the first controller assigns the data write command to the second controller, the first controller transmits the space indicator information to the first remote connector to control the first remote connector to use the RDMA protocol to make the application data transferred from the host to the second memory through the first remote connector, the first local connector and the second local connector in sequence and written into the reserved space in the second memory.

In an embodiment, the first processor and the second processor are electronic devices complying with NVMe standard.

In an embodiment, the first processor, the second processor, the first remote connector, the first local connector and the second local connector are electronic devices complying with PCIe standard.

In an embodiment, the second controller further comprises a second remote connector electrically coupled to the second processor, wherein data transmission between the second remote connector and the host are performed through the RDMA protocol.

BRIEF DESCRIPTION OF THE DRAWINGS

The advantages of the present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
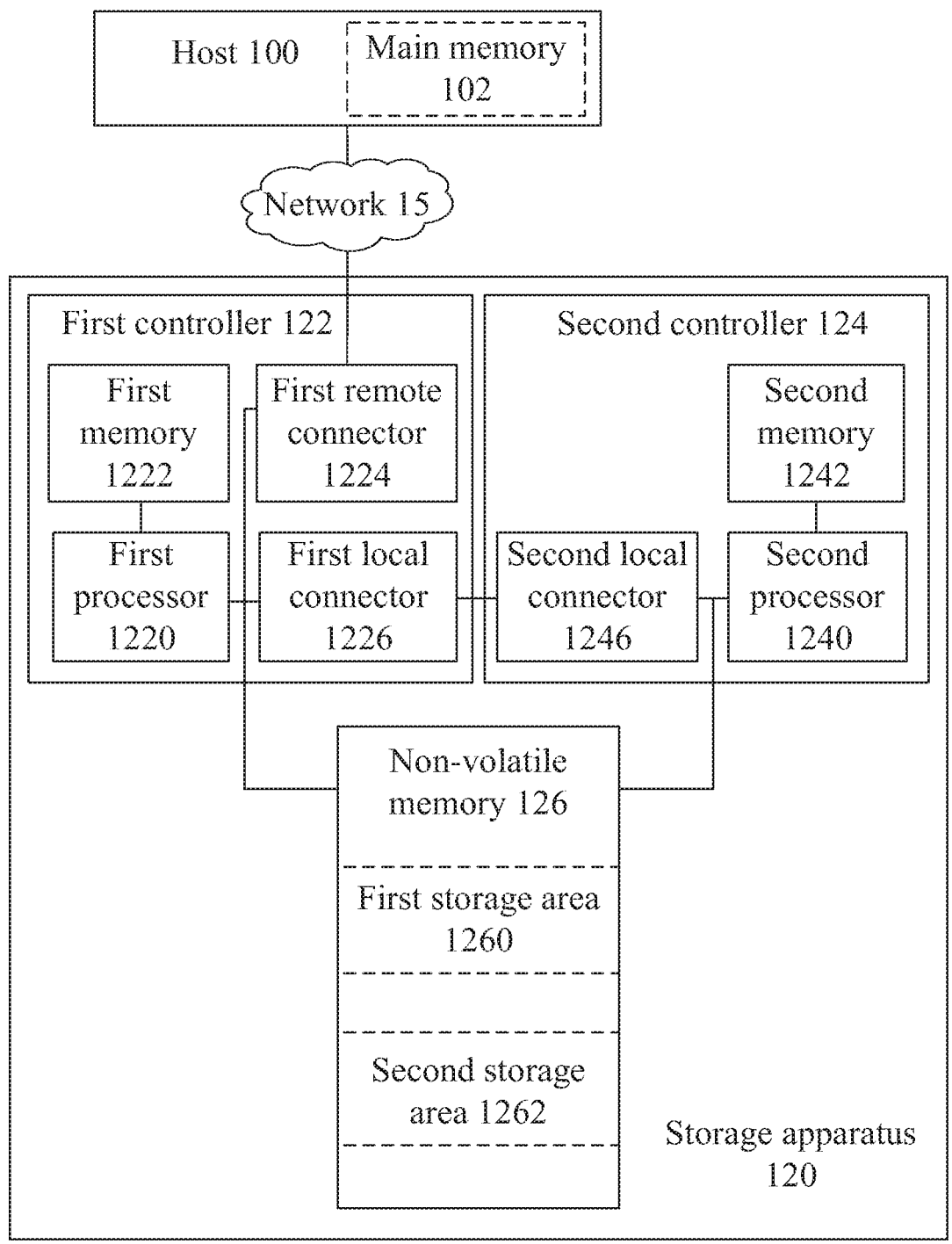
FIG. 1 is a block diagram illustrating a multi-controller storage system according to an embodiment of the present disclosure.

Please refer to FIG. 1, which is a block diagram illustrating a multi-controller storage system according to an embodiment of the present disclosure. In the embodiment, the multi-controller storage system 10 includes a host 100 and a storage apparatus 120, both of which could communicate with each other through the network 15. The host 100 generally refers to all kinds of data resources, e.g. computer or file server. The host 100 includes a main memory 102 for storing data. The host 100 uses the non-volatile memory express (NVMe) over remote direct memory access (RDMA) protocol (called NVMe over RDMA protocol) to transfer the application data stored in the host 100.

As shown in the diagram, the storage apparatus 120 includes a first controller 122, a second controller 124 and a non-volatile memory 126. The first controller 122 further includes a first processor 1220, a first memory 1222, a first remote connector 1224 and a first local connector 1226. The first processor 1220 is electrically coupled to the first memory 1222, the first remote connector 1224 and the first local connector 1226. The first remote connector 1224 supports remote direct memory access and can transfer data from/to the host 100 via RDMA protocol. On the other hand, the second controller 124 includes a second processor 1240, a second memory 1242 and a second local connector 1246. The second processor 1240 is electrically coupled to the second memory 1242 and the second local connector 1246. The non-volatile memory 126 is electrically coupled to the first controller 122 and the second controller 124 to allow the first processor 1220 and the second processor 1240 to access the non-volatile memory 126. In addition, the first local connector 1226 is further electrically coupled to the second local connector 1246 to establish a data transmission channel between the first controller 122 and the second controller 124.

Figure 2:
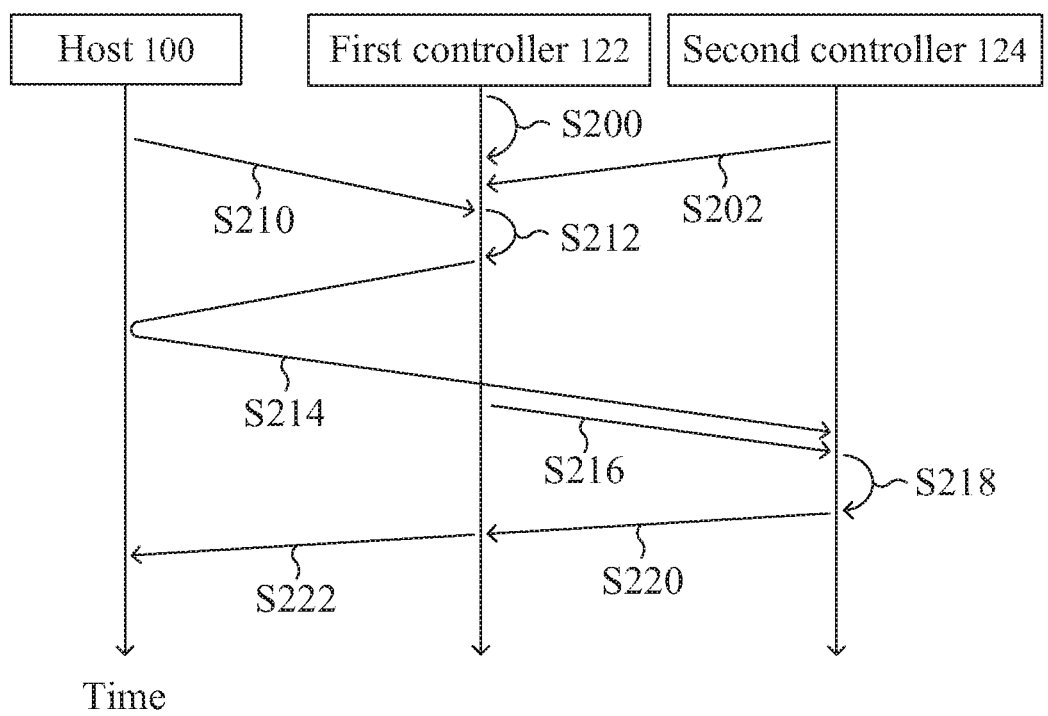
FIG. 2 is a sequence diagram showing the timing of data and command transfer in the multi-controller storage system.

Please refer to FIG. 2, which is a sequence diagram showing the timing of data and command transfer in the multi-controller storage system. The participants in the operations, i.e. the host 100, the first controller 122 and the second controller 124, are shown on the top of the parallel vertical lines. The vertical direction represents the time sequence of the operations in progress.

In the embodiment, before the first processor 1220 starts to distribute control commands to corresponding controllers, each controller (e.g. the first controller 122 and the second controller 124) arranges a reserved space, ready for receiving application data (e.g. data to be written into the storage apparatus 120), in its own memory and the location of the reserved space is recorded in the first controller 122 (step S200 performed by the first controller 122 and step S202 performed by the second controller 124). Once receiving a control command from the host 100 (step S210), the first controller 122 determines which controller is selected to process the control command according to a predetermined rule (step S212). For example, the second controller 124 is selected to process the control command in FIG. 2. Subsequently, the first controller 122 performs remote direct memory access to the host 100 through the RDMA protocol to retrieve the application data associated with the control command. Then, the retrieved application data are put into the reserved space in the second memory 1242 of the second controller 124 according to the recorded location of the reserved space previously provided by the second controller 124 (step S214). After the application data have been put into the reserved space, the first controller 122 transmits the information, including the control command and the location of the application data in the second memory 1242 to the second controller 124 (step S216). Thus, the second controller 124 can perform a corresponding operation according to the information and the application data obtained in step S214 (step S218). After completing the corresponding operation, the second controller 124 transmits an operation result in a specific format to the first controller 122, and further provides the first controller 122 with the location of a reserved space which is currently ready for receiving other application data (step S220). Finally, the first controller 122 notifies the host 100 that the control command issued in step S210 has been executed (step S222).

The following description with reference to FIG. 1 and FIG. 2 is provided for realizing the concept of the present disclosure.

The first controller 122 and the second controller 124 in FIG. 1 are separate physical circuits. The first controller 122 can directly access the first memory 1222, and the second controller 124 can directly access the second memory 1242. From another view point, the first processor 1220 of the first controller 122 can directly access the data stored in the first memory 1222, but can not directly access the data stored in the second memory 1242 of the second controller 124. Similarly, the second processor 1240 of the second controller 124 can directly access the data stored in the second memory 1242, but can not directly access the data stored in the first memory 1222 of the first controller 122.

To give the first controller 122 the right to distribute the control commands, the first controller 122 should collect necessary information related to the second controller 124. Since the first controller 122 is not allowed to directly access the data in the second memory 1242, the second controller 124 should actively provide the necessary information to the first controller 122 and the information is recorded in the first controller 122 for later use. Because most of the control commands involve read operations or write operations, the space in the memory of each controller is usually monitored. Accordingly, the information provided to the first controller 122 generally includes the information of the second memory 1242, e.g. the location of the reserved space (called space indicator information hereinafter) ready for receiving the application data. This space indicator information is recorded in the first controller 122, and includes the start address and capacity of at least one reserved space in the second memory 1242. The reserved space, indicated by the space indicator information recorded in the first controller 122, is kept unused till a control command is assigned to the second controller 124 to avoid overwriting the reserved space.

In the embodiment, the first controller 122 serves as the primary controller to distribute the control commands to corresponding secondary controllers. Under these conditions, the second controller 124 serving as the secondary controller should provide its space indicator information to the first controller 122 through the second local connector 1246 and the first local connector 1226 upon starting up the storage apparatus 120 (step S202). At this time, the first controller 122 serving as the primary controller may also provide a reserved space in the first memory 1222 for later use (step S200). Thus, the controllers have consistent design logic and it is beneficial to program or hardware designers. On the other hand, because the first controller 122 can directly access the data stored in the first memory 1222, the first controller 122 unlikely mistakenly overwrites the data in the first memory 1222. Therefore, the step S200 could be omitted in other embodiments.

Subsequently, when the host 100 has been electrically connected to the storage apparatus 120 via the network 15, the host 100 can start to send the control command to the storage apparatus 120 (step S210). In the embodiment, since the storage apparatus 120 designates the first controller 122 as the primary controller, the control command is transmitted to the first controller 122, and the first controller 122 will decide whether the control command is executed by the first controller 122 or the second controller 124 (step S212). The decision could be made by any form of software, firmware or hardware. The algorithm used in the decision has many choices due to its sustainable development, e.g. algorithm based on load-balancing or mechanical life. The choice of the algorithm does not affect the concept of the present disclosure and further description is not given herein.

On condition that the first controller 122 decides to execute the control command by itself, the first controller 122 actively performs the operation. If the application data stored in a specific data block of the main memory 102 of the host 100 are specified in the control command, the first controller 122 controls the first remote connector 1224 to use the RDMA protocol to retrieve the specified application data from the host 100 and stores the specified application data into the first memory 1222. By using the RDMA protocol, the application data are transferred from the main memory 102 to the first memory 1222 without involving the first processor 1220. It is to be noted that the data transfer may or may not go through a circuit related to the first processor 1220 based on the circuit design, and both conditions do not depart from the concept of the present disclosure.

On the contrary, if the first controller 122 decides to assign the control command to the second controller 124, the first controller 122 obtains the information about the reserved space in the second memory 1242 from the recorded space indicator information. The information related to the reserved space is carried by a NVMe over RDMA capsule. By using the NVMe over RDMA capsule, the first remote connector 1224 performs remote direct memory access to transfer the application data from the main memory 102 to the reserved space in the second memory 1242 through the network 15, the first remote connector 1224, the first local connector 1226 and the second local connector 1246 in sequence (step S214). Similar to the data transfer between the main memory 102 and the first memory 1222 in the above embodiment, by using the RDMA protocol, the application data are transferred from the main memory 102 to the second memory 1242 without involving the first processor 1220 and the second processor 1240.

Through the operation, the application data stored in the host 100 are directly written into the secondary controller (i.e. the second controller 124 in the embodiment), but not written into the primary controller prior to the secondary controller. Therefore, the present disclosure reduces the data transfer steps to speed data processing and reduce data transfer failure.

At this time, the first controller 122 transmits the information of the reserved space in the second memory 1242 for receiving the current application data (e.g. the space indicator information of the second controller 124 received in step S202) to the second controller 124 (step S216). In response, the second controller 124 executes the control command according to the information received in step S216 and the application data received in step S214, for example, to write the application data into the non-volatile memory 126 when the control command is a data write command (step S218).

After the control command has been executed, the first controller 122 and the second controller 124 reply the host 100 with the operation result based on any know responding mechanism. The responding mechanism may involve steps S220 and S222 as shown in FIG. 2, but is not limited to these steps.

It is to be noted that, to simplify the procedure, when the host 100 and the storage apparatus 120 are initially connected to each other, a rule providing that inline data in a control command are impermissible may be defined in an existing communication protocol between the host 100 and the storage apparatus 120. Hence, no addition processing tasks would be performed to process the inline data in the control command, and the control command and the application data can be respectively handled through the above-described mechanism. Nevertheless, the present disclosure can be applied to the condition involving inline data still, and corresponding action is taken. For example, the inline data are temporarily stored in the first memory 1222, and than transferred to a specific space (e.g. one of reserved spaces indicated in the space indicator information) of the second memory 1242. Further, the first controller 122 notifies the second controller 124 of the location of the inline data stored in the second memory 1242 in step S216. The other steps could refer to the above embodiments without departing from the concept of the present disclosure.

For performing the remote direct memory access, the first remote connector 1224 is a network adapter supporting remote direct memory access. The first controller 122 and the second controller 124 are electronic devices complying with peripheral component interconnect express (PCIe) standard. When the first processor 1220, the second processor 1240, the first local connector 1226, the second local connector 1246 and the first remote connector 1224 are electronic devices complying with PCIe standard, the communication between the electronic devices is conducted through PCIe interfaces.

The first controller 122 and the second controller 124 can use the NVMe protocol to access the non-volatile memory 126. For example, while adopting the NVMe standard, the first storage area 1260 of the non-volatile memory 126 is a namespace accessible to the first controller 122, and the second storage area 1262 of the non-volatile memory 126 is a namespace accessible to the second controller 124. Alternatively, each of the first storage area 1260 and the second storage area 1262 is a namespace accessible to both the first controller 122 and the second controller 124. In particular, the control commands are executed by the first processor 1220 or the second processor 1240, and thus the first processor 1220 and the second processor 1240 should be operable with programs using the NVMe protocol.

Figure 3:
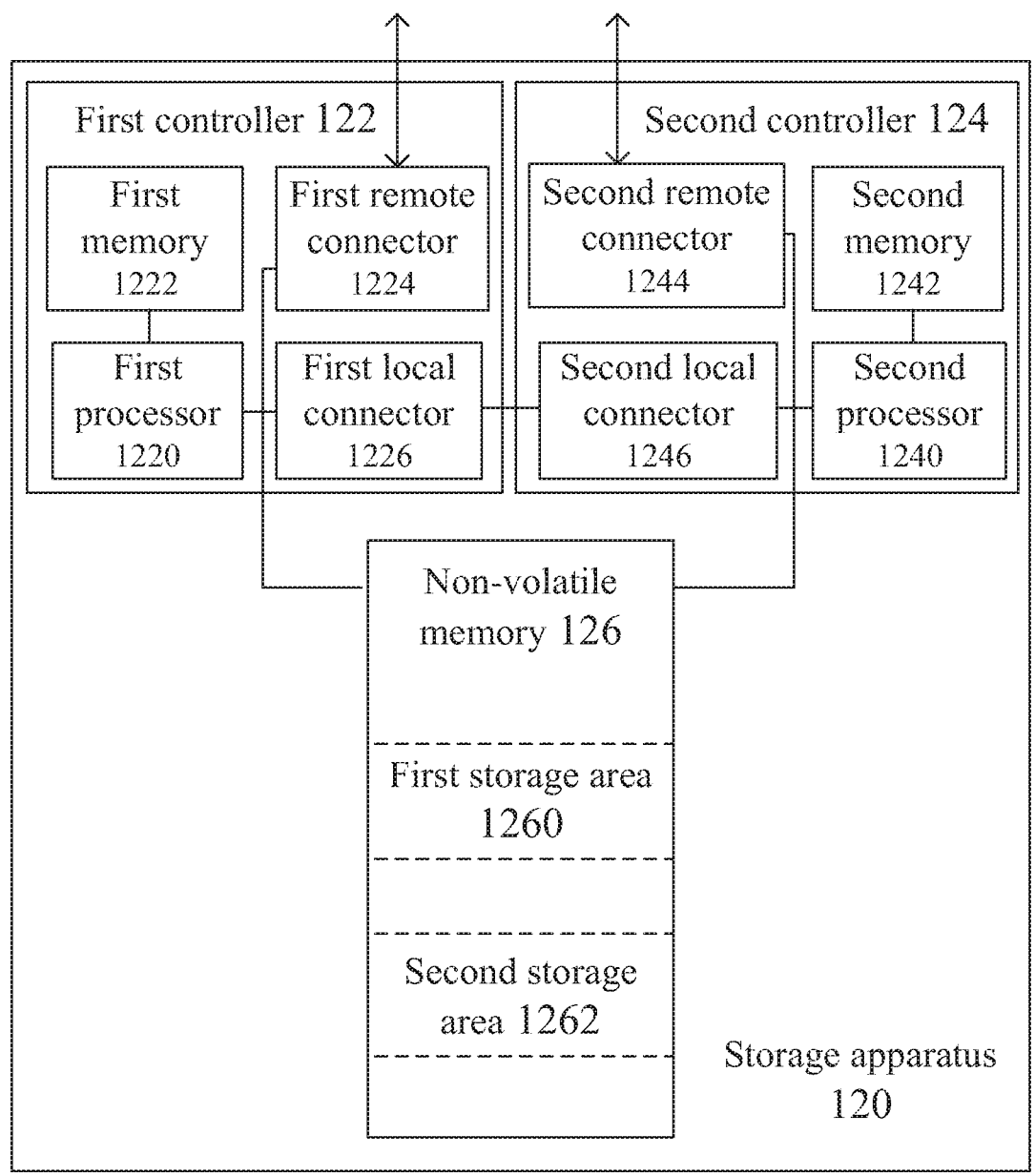
FIG. 3 is a block diagram illustrating a multi-controller storage system according to another embodiment of the present disclosure.

There are various modifications to the embodiments and the modifications are considered to be included in the scope of the present disclosure. For example, FIG. 3 illustrates a multi-controller storage system according to another embodiment of the present disclosure. The same reference numbers in FIG. 1 and FIG. 3 identify the same or similar elements which are not further descried herein. In particular, the second controller 124 further includes a second remote connector 1244. The second remote connector 1244 of the second controller 124 has similar connection relation to the first remote connector 1224 of the first controller 122. The role of the second remote connector 1244 in the second controller 124 is equivalent to that of the first remote connector 1224 in the first controller 122. Therefore, the details about the second remote connector 1244 can be derived from the description concerning the first remote connector 1224 without further illustration. In the embodiment, the second controller 124 can substitute for the first controller 122 to serve as the primary controller. Thus, when the first controller 122 malfunctions, the second controller 124 can take over the command distribution task to keep normal operation of the multi-controller storage system and the storage apparatus.

In conclusion, the present disclosure is applicable to a storage system and storage apparatus having at least two controllers and using the NVMe over RDMA protocol to perform data transmission. The information of the reserved spaces of multiple controllers is collected and recorded in the primary controller at first. Upon assigning an access request to one controller, the application data are transferred from the data source to the assigned controller through the RDMA protocol. The present disclosure can reduce the data transfer times among the memories to increase data storage efficiency and reduce data transfer failure.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-controller storage system using a non-volatile memory express over remote direct memory access protocol, the multi-controller storage system comprising:
   a host, comprising a main memory for storing application data, the host transferring the application data from the main memory through a remote direct memory access protocol; and
   a storage apparatus, comprising:
      a first controller, comprising a first processor, a first memory, a first remote connector and a first local connector, the first processor being electrically coupled to the first memory, the first remote connector and the first local connector, wherein data transmission between the first remote connector and the host are performed through the remote direct memory access protocol;
      a second controller, comprising a second processor, a second memory and a second local connector, the second processor being electrically coupled to the second memory and the second local connector; and
      a non-volatile memory, electrically coupled to the first controller and the second controller and accessible to the first processor and the second processor,
   wherein the first local connector is electrically coupled to the second local connector; the second processor transmits space indicator information representing a location of a reserved space in the second memory to the first controller through the second local connector and the first local connector; and when the host transmits a data write command to the first controller and the first controller assigns the data write command to the second controller, the first controller transmits the space indicator information to the first remote connector and controls the first remote connector to use the remote direct memory access protocol to make the application data transferred from the host to the second memory through the first remote connector, the first local connector and the second local connector in sequence and written into the reserved space in the second memory wherein the first controller does not load the application data into the first memory while the application data is transferred through the first controller.

2. The multi-controller storage system according to claim 1, wherein the first processor and the second processor are operable with programs using a non-volatile memory express protocol.

3. The multi-controller storage system according to claim 1, wherein the first processor, the second processor, the first remote connector, the first local connector and the second local connector are electronic devices complying with peripheral component interconnect express standard.

4. The multi-controller storage system according to claim 1, wherein the second controller further comprises a second remote connector electrically coupled to the second processor, wherein data transmission between the second remote connector and the host are performed through the remote direct memory access protocol.

5. The multi-controller storage system according to claim 4, wherein the second remote connector is an electronic device complying with peripheral component interconnect express standard.

6. A storage apparatus using a non-volatile memory express over remote direct memory access protocol and adapted to be used for receiving application data from a host, the storage apparatus comprising:
   a first controller, comprising a first processor, a first memory, a first remote connector and a first local connector, the first processor being electrically coupled to the first memory, the first remote connector and the first local connector, wherein data transmission between the first remote connector and the host are performed through a remote direct memory access protocol;
   a second controller, comprising a second processor, a second memory and a second local connector, the second processor being electrically coupled to the second memory and the second local connector; and
   a non-volatile memory, electrically coupled to the first controller and the second controller and accessible to the first processor and the second processor,
   wherein the first local connector is electrically coupled to the second local connector; the second processor transmits space indicator information representing a location of a reserved space in the second memory to the first controller through the second local connector and the first local connector; and when the host transmits a data write command to the first controller and the first controller assigns the data write command to the second controller, the first controller transmits the space indicator information to the first remote connector and controls the first remote connector to use the remote direct memory access protocol to make the application data transferred from the host to the second memory through the first remote connector, the first local connector and the second local connector in sequence and written into the reserved space in the second memory wherein the first controller does not load the application data into the first memory while the application data is transferred through the first controller.

7. The storage apparatus according to claim 6, wherein the first processor and the second processor are operable with programs using a non-volatile memory express protocol.

8. The storage apparatus according to claim 6, wherein the first processor, the second processor, the first remote connector, the first local connector and the second local connector are electronic devices complying with peripheral component interconnect express standard.

9. The storage apparatus according to claim 6, wherein the second controller further comprises a second remote connector electrically coupled to the second processor, wherein data transmission between the second remote connector and the host are performed through the remote direct memory access protocol.

10. The storage apparatus according to claim 9, wherein the second remote connector is an electronic device complying with peripheral component interconnect express standard.

* * * * *